United States Patent
Choi et al.

(10) Patent No.: US 11,856,589 B2
(45) Date of Patent: Dec. 26, 2023

(54) METHOD, USER EQUIPMENT, DEVICE AND STORAGE MEDIUM FOR MONITORING CONTROL CHANNEL, AND BASE STATION FOR TRANSMITTING CONTROL CHANNEL

(71) Applicant: LG ELECTRONICS INC., Seoul (KR)

(72) Inventors: Seunghwan Choi, Seoul (KR); Suckchel Yang, Seoul (KR); Seonwook Kim, Seoul (KR)

(73) Assignee: LG ELECTRONICS, INC, Seoul (KR)

( * ) Notice: Subject to any disclaimer, the term of this patent is extended or adjusted under 35 U.S.C. 154(b) by 0 days.

(21) Appl. No.: 18/162,918

(22) Filed: Feb. 1, 2023

(65) Prior Publication Data

US 2023/0269746 A1   Aug. 24, 2023

Related U.S. Application Data

(60) Provisional application No. 63/312,072, filed on Feb. 20, 2022.

(51) Int. Cl.
*H04W 72/04* (2023.01)
*H04W 24/08* (2009.01)
*H04W 72/23* (2023.01)
*H04W 72/0446* (2023.01)

(52) U.S. Cl.
CPC .......... *H04W 72/23* (2023.01); *H04W 24/08* (2013.01); *H04W 72/0446* (2013.01)

(58) Field of Classification Search
CPC .. H04W 72/23; H04W 24/08; H04W 72/0446
See application file for complete search history.

(56) References Cited

U.S. PATENT DOCUMENTS

| | | | |
|---|---|---|---|
| 11,395,283 B2 * | 7/2022 | Lin | H04L 5/0053 |
| 2021/0058970 A1 * | 2/2021 | Kwak | H04L 5/0064 |
| 2021/0399858 A1 * | 12/2021 | Yang | H04L 5/0053 |
| 2022/0217694 A1 * | 7/2022 | Kim | H04L 1/1864 |
| 2022/0232401 A1 * | 7/2022 | Nam | H04L 5/0053 |
| 2022/0295319 A1 * | 9/2022 | Lin | H04W 72/0446 |
| 2022/0304015 A1 * | 9/2022 | Yi | H04W 24/08 |
| 2022/0361022 A1 * | 11/2022 | Cheng | H04W 24/08 |
| 2023/0048970 A1 * | 2/2023 | Khoshnevisan | H04L 5/001 |
| 2023/0103606 A1 * | 4/2023 | Lee | H04W 72/23 |
| | | | 370/329 |

* cited by examiner

*Primary Examiner* — Michael J Moore, Jr.
(74) *Attorney, Agent, or Firm* — LEE, HONG, DEGERMAN, KANG & WAIMEY

(57) ABSTRACT

Disclosed herein are a method and device for monitoring a signal in a wireless communication system, including PDCCH monitoring based on a configuration related to a search space. The maximum valid value of the slot duration for the search space is limited to a value obtained by subtracting L from the periodicity, where L is related to the size of slot-groups configured for the search space.

15 Claims, 8 Drawing Sheets

```
Receive a configuration regarding a     ⟵ S501
search space.
          │
          ▼
Perform PDCCH monitoring based on the   ⟵ S503
configuration regarding the search space.
```

METHOD, USER EQUIPMENT, DEVICE AND STORAGE MEDIUM FOR MONITORING CONTROL CHANNEL, AND BASE STATION FOR TRANSMITTING CONTROL CHANNEL

CROSS-REFERENCE TO RELATED APPLICATION(S)

Pursuant to 35 U.S.C. § 119(e), this application claims the benefit of U.S. Provisional Patent Application No. 63/312,072, filed on Feb. 20, 2022, the contents of which is hereby incorporated by reference herein in its entirety.

TECHNICAL FIELD

The present disclosure relates to a method and apparatus for use in a wireless communication system.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

SUMMARY

The object of the present disclosure is to provide a method and apparatus for monitoring a control signal efficiently in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

The present disclosure provides a method and apparatus for monitoring a control channel in a wireless communication system. In one aspect of the present disclosure, provided herein is a method for monitoring a control channel by a user equipment (UE) in a wireless communication system. The method may include receiving a configuration related to a search space set for a downlink (DL) bandwidth part (BWP) of a cell; and performing physical downlink control channel (PDCCH) monitoring in the DL BWP based on the configuration, wherein the configuration comprises: (i) a first parameter related to a periodicity and an offset of the PDCCH monitoring for the search space set; (ii) a second parameter related to D as a number of consecutive slots where the search space set can exist; and (iii) a third parameter related to L as a size of a slot-group configured for the search space, wherein the PDCCH monitoring is performed for the search space set within D slots, wherein the D slots are started from a slot determined based on the first parameter and a number of the D slots is determined based on the second parameter, and wherein a maximum valid value of the second parameter is a value obtained by subtracting the L from the periodicity.

In another aspect of the present disclosure, provided herein is a user equipment including at least one transceiver, at least one processor, and at least one memory operatively connected to the at least one processor and configured to store instructions that, when executed, cause the at least one processor to perform the operations according to the method for monitoring the control channel.

In another aspect of the present disclosure, provided herein is a device including at least one processor, and at least one memory storing instructions that, when executed, cause the at least one processor to perform the operations according to the method for monitoring the control channel.

In another aspect of the present disclosure, provided herein is a computer-readable non-volatile storage medium containing at least one computer program that causes at least one processor to perform the operations according to the method for monitoring the control channel. In another aspect of the present disclosure, provided herein is a method or a base station for transmitting a control channel to a terminal in a wireless communication system is provided. The base station includes at least one transceiver, at least one processor, and at least one memory configured to store instructions that, when executed, cause the at least one processor to perform operations. The method or the operations may include transmitting a configuration related to a search space set for a downlink (DL) bandwidth part (BWP) of a cell; and transmitting a physical downlink control channel (PDCCH) in the DL BWP based on the configuration, wherein the configuration comprises: (i) a first parameter related to a periodicity and an offset of monitoring of the PDCCH for the search space set; (ii) a second parameter related to D as a number of consecutive slots where the search space set can exist; and (iii) a third parameter related to L as a size of a slot-group configured for the search space set, wherein the PDCCH monitoring is performed for the search space set within D slots, wherein the D slots are started from a slot determined based on the first parameter and a number of the D slots is determined based on the second parameter, and wherein a maximum valid value of the second parameter is a value obtained by subtracting the L from the periodicity.

In each aspect of the present disclosure, the third parameter may include a bitmap indicating a slot configured for the PDCCH monitoring in the slot-group.

In each aspect of the present disclosure, the L may be equal to a length of the bitmap.

In each aspect of the present disclosure, the second parameter may be set to a multiple of the L.

In each aspect of the present disclosure related to the method carried out by the UE, the UE, the device, or the storage medium, the method or operations may further include reporting as a UE capability a combination (X, Y) related to i) groups of X slots and ii) Y slots within the X slots, wherein X and Y are numbers of consecutive slots and the groups of X slots are non-overlapping and consecutive. The PDCCH monitoring may be performed based on the configuration and the combination (X, Y). In each aspect of the present disclosure related to the method carried out by the base station, or the base station, the method or operations may further include receiving a terminal capacity report including a combination (X, Y) related to i) groups of X slots and ii) Y slots within the X slots, wherein X and Y are numbers of consecutive slots and the groups of X slots are non-overlapping and consecutive. Transmitting the PDCCH may be performed based on the configuration and the combination (X, Y).

In each aspect of the present disclosure related to the method carried out by the UE, the UE, the device, or the storage medium, the method or operations may further include: reporting as a UE capability a plurality of combinations (X, Y) related to i) groups of X slots and ii) Y slots within the X slots, wherein X and Y are numbers of consecutive slots; and the groups of X slots are non-overlapping and consecutive; and determining a combination (X, Y) for the PDCCH monitoring among the reported plurality of combinations (X, Y) based on the configuration. Based on one or more combinations (X, Y) of the reported plurality of combinations (X, Y) being related to the configuration, the PDCCH monitoring may be performed according to a combination (X, Y) with a greatest value of X among the one or more combinations (X, Y). In each aspect of the present disclosure related to the method carried out by the base station, or the base station, the method or operations may further include receiving a terminal capacity report including a plurality of combinations (X, Y) related to i) groups of X slots and ii) Y slots within the X slots, wherein X and Y are numbers of consecutive slots and the groups of X slots are non-overlapping and consecutive. Based on one or more combinations (X, Y) of the reported plurality of combinations (X, Y) being related to the configuration, transmitting the PDCCH may be performed according to a combination (X, Y) with a greatest value of X among the one or more combinations (X, Y)

The devices may include an autonomous driving vehicle for communicating with at least a UE, a network, and another autonomous driving vehicle other than the device.

The aspects of the disclosure are only a part of the preferred embodiments of the disclosure, and various embodiments based on technical features of the disclosure may be devised and understood by the person with ordinary skill in the art based on the detailed description of the disclosure.

According to an embodiment of the present disclosure, when a control signal is monitored by a UE, signal monitoring may be performed more efficiently through a differentiated operation from the conventional technology.

The advantageous effects of the present disclosure are not limited to the above-mentioned effects, and other advantageous effects may be inferred from the embodiments of the present disclosure.

DETAILED DESCRIPTION

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

For clarity of description, the present disclosure will be described in the context of a 3GPP communication system (e.g., LTE and NR), which should not be construed as limiting the spirit of the present disclosure. LTE refers to a technology beyond 3GPP TS 36.xxx Release 8. Specifically, the LTE technology beyond 3GPP TS 36.xxx Release 10 is called LTE-A, and the LTE technology beyond 3GPP TS 36.xxx Release 13 is called LTE-A pro. 3GPP NR is the technology beyond 3GPP TS 38.xxx Release 15. LTE/NR may be referred to as a 3GPP system. "xxx" specifies a technical specification number. LTE/NR may be generically referred to as a 3GPP system. For the background technology, terminologies, abbreviations, and so on as used herein, refer to technical specifications published before the present disclosure. For example, the following documents may be referred to.

Figure 1:
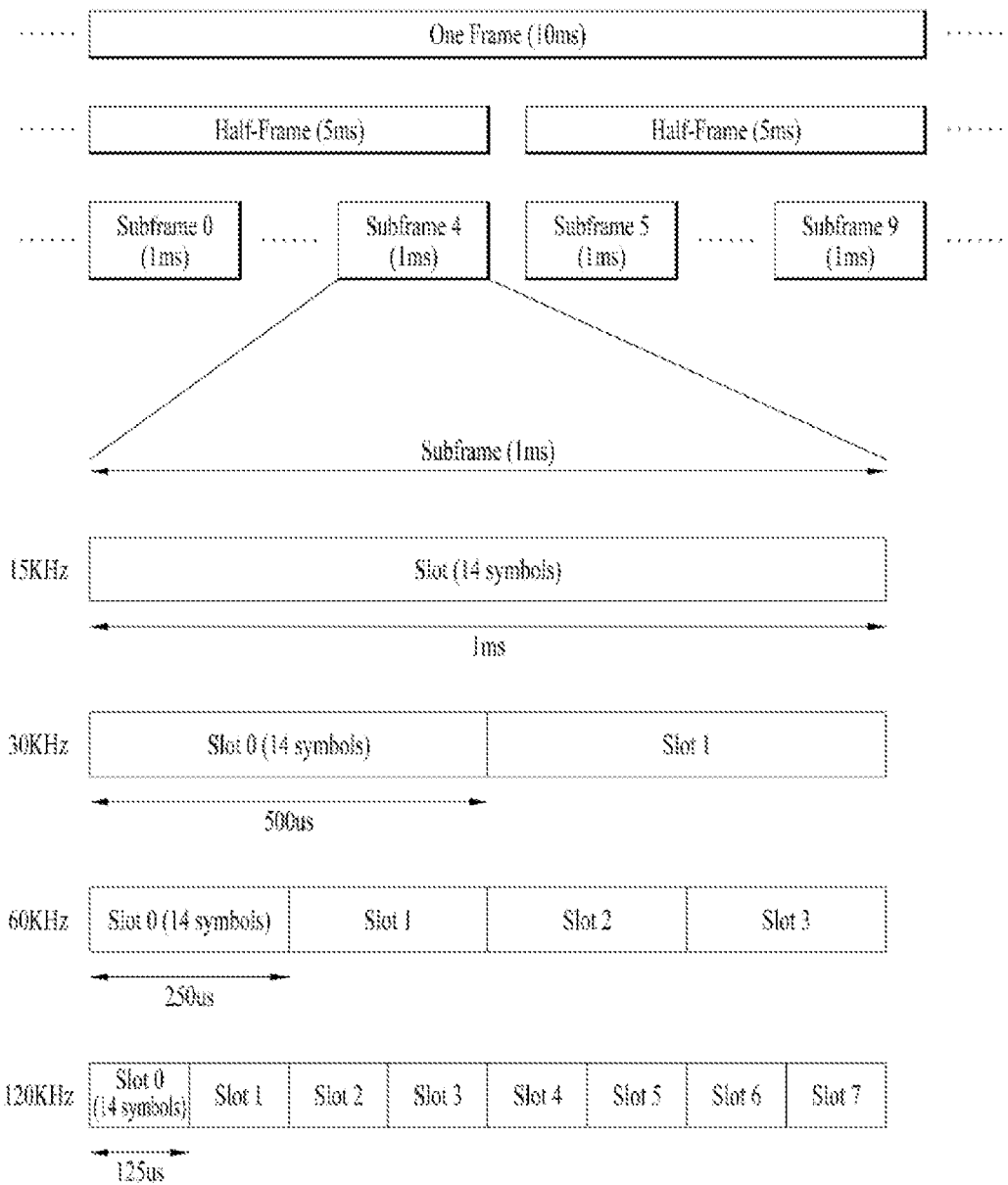
FIG. 1 illustrates a radio frame structure.

3GPP NR
38.211: Physical channels and modulation
38.212: Multiplexing and channel coding
38.213: Physical layer procedures for control
38.214: Physical layer procedures for data
38.300: NR and NG-RAN Overall Description
38.331: Radio Resource Control (RRC) protocol specification FIG. 1 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS ($15 * 2^u$) | $N_{symb}^{slot}$ | $N_{slot}^{frame,u}$ | $N_{slot}^{subframe,u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |

TABLE 1-continued

| SCS (15 * 2^u) | $N_{symb}^{slot}$ | $N_{slot}^{frame,u}$ | $N_{slot}^{subframe,u}$ |
|---|---|---|---|
| 120 KHz (u = 3) | 14 | 80 | 8 |
| 240 KHz (u = 4) | 14 | 160 | 16 |

* $N_{symb}^{slot}$: number of symbols in a slot
* $N_{slot}^{frame,u}$: number of slots in a frame
* $N_{slot}^{subframe,u}$: number of slots in a subframe Table 2 illustrates that the number of symbols per slot, the number of slots per frame, and the number of slots per subframe vary according to SCSs in an extended CP case.

TABLE 2

| SCS (15 * 2^u) | $N_{symb}^{slot}$ | $N_{slot}^{frame,u}$ | $N_{slot}^{subframe,u}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

NR may support various numerologies (or subcarrier spacings (SCSs)) to provide various 5G services. For example, NR may support a wide area in conventional cellular bands for an SCS of 15 kHz and support a dense urban area and a wide carrier bandwidth with lower latency for an SCS of 30 or 60 kHz. For an SCS of 60 kHz or above, NR may support a bandwidth higher than 24.25 GHz to overcome phase noise.

NR frequency bands may be divided into two frequency ranges: frequency range 1 (FR1) and frequency range 2 (FR2). FR1 and FR2 may be configured as shown in Table A6 below. FR 2 may mean a millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 2:
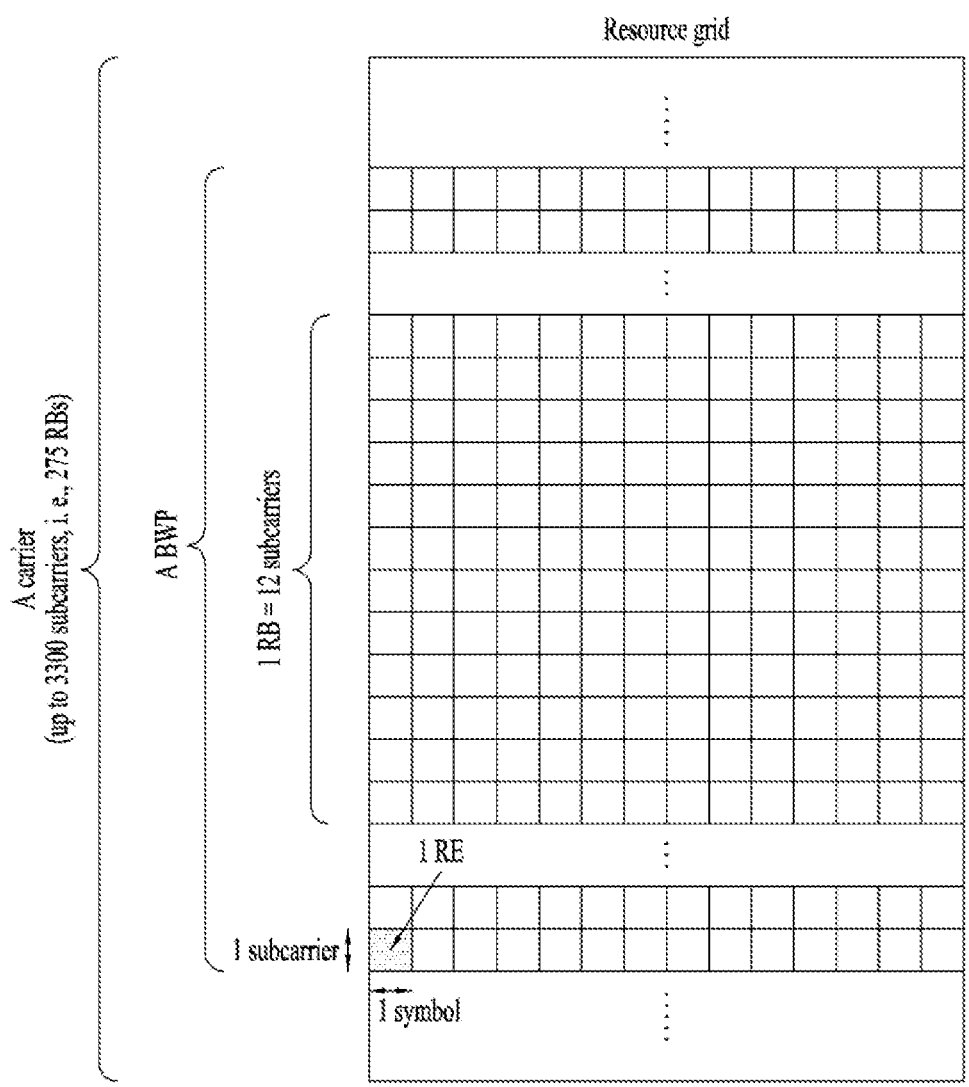
FIG. 2 illustrates a resource grid during the duration of a slot.

FIG. 2 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

In a wireless communication system, a UE receives information from a BS in downlink (DL), and the UE transmits information to the BS in uplink (UL). The information exchanged between the BS and UE includes data and various control information, and various physical channels/signals are present depending on the type/usage of the information exchanged therebetween. A physical channel corresponds to a set of resource elements (REs) carrying information originating from higher layers. A physical signal corresponds to a set of REs used by physical layers but does not carry information originating from the higher layers. The higher layers include a medium access control (MAC) layer, a radio link control (RLC) layer, a packet data convergence protocol (PDCP) layer, a radio resource control (RRC) layer, and so on.

DL physical channels include a physical broadcast channel (PBCH), a physical downlink shared channel (PDSCH), and a physical downlink control channel (PDCCH). DL physical signals include a DL reference signal (RS), a primary synchronization signal (PSS), and a secondary synchronization signal (SSS). The DL RS includes a demodulation reference signal (DM-RS), a phase tracking reference signal (PT-RS), and a channel state information reference signal (CSI-RS). UL physical channel include a physical random access channel (PRACH), a physical uplink shared channel (PUSCH), and a physical uplink control channel (PUCCH). UL physical signals include a UL RS. The UL RS includes a DM-RS, a PT-RS, and a sounding reference signal (SRS).

Figure 3:
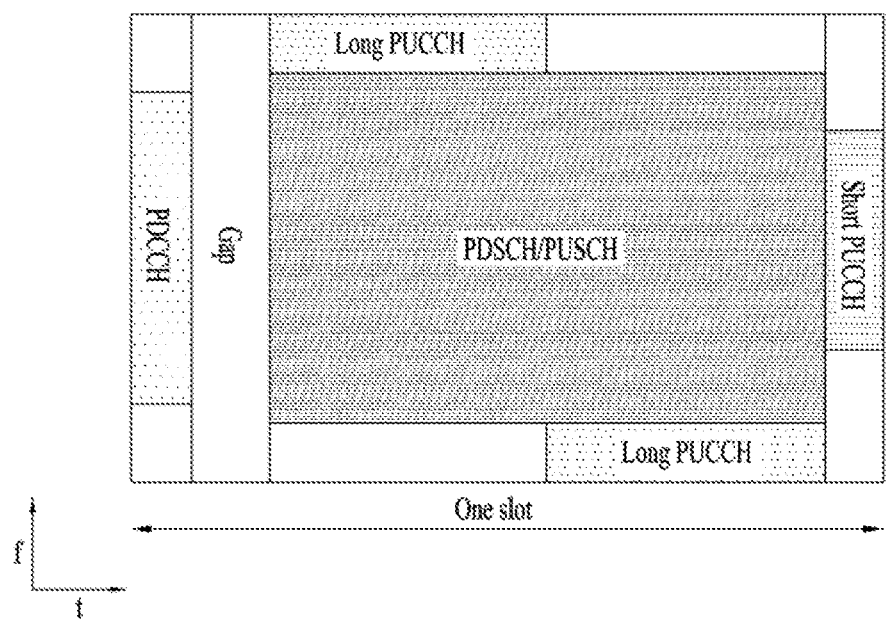
FIG. 3 shows an example in which a physical channel is mapped in a slot.

FIG. 3 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

In the present disclosure, a base station (BS) may be, for example, a gNode B (gNB).

DL Physical Channel/Signal (1) PDSCH

A PDSCH carries DL data (e.g., DL-shared channel transport block (DL-SCH TB)). The TB is coded into a codeword (CW) and then transmitted after scrambling and modulation processes. The CW includes one or more code blocks (CBs). One or more CBs may be grouped into one code block group (CBG). Depending on the configuration of a cell, the PDSCH may carry up to two CWs. Scrambling and modulation may be performed for each CW, and modulation symbols generated from each CW may be mapped to one or more layers. Each layer may be mapped to resources together with a DMRS after precoding and transmitted on a corresponding antenna port. The PDSCH may be dynamically scheduled by a PDCCH (dynamic scheduling). Alternatively, the PDSCH may be semi-statically scheduled based on higher layer (e.g., RRC) signaling (and/or Layer 1 (L1) signaling (e.g., PDCCH)) (configured scheduling (CS)). Therefore, in the dynamic scheduling, PDSCH transmission is accompanied by the PDCCH, whereas in the CS, PDSCH transmission may not be accompanied by the PDCCH. The CS may include semi-persistent scheduling (SPS).

(2) PDCCH

A PDCCH carries Downlink Control Information (DCI). For example, the PDCCH (i.e., DCI) may carry: transmission formats and resource allocation of a DL-SCH; frequency/time resource allocation information on an uplink shared channel (UL-SCH); paging information on a paging channel (PCH); system information on a DL-SCH; time/frequency resource allocation information on a higher layer control message such as a random access response (RAR) transmitted over a PDSCH; transmit power control commands; and information on activation/deactivation of SPS/CS. Various DCI formats may be provided depending on information in DCI.

Table 4 shows DCI formats transmitted over the PDCCH.

TABLE 4

| DCI format | Usage |
|---|---|
| 0_0 | Scheduling of PUSCH in one cell |
| 0_1 | Scheduling of one or multiple PUSCH in one cell, or indicating downlink feedback information for configured grant PUSCH (CG-DFI) |
| 1_0 | Scheduling of PDSCH in one cell |
| 1_1 | Scheduling of PDSCH in one cell, and/or triggering one shot HARQ-ACK codebook feedback |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH Trassmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a CBG-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or UL scheduling information. DCI format 2_0 may be used to provide dynamic slot format information (e.g., dynamic SFI) to the UE, and DCI format 2_1 may be used to provide downlink pre-emption information to the UE. UEs defined as one group may be provided with DCI format 2_0 and/or DCI format 2_1 over a group common PDCCH, which is a PDCCH defined for a group of UEs.

The PDCCH/DCI may include a cyclic redundancy check (CRC), and the CRC may be masked/scrambled with various identifiers (e.g., radio network temporary identifier (RNTI)) according to the owner or purpose of the PDCCH. For example, if the PDCCH is for a specific UE, the CRC may be masked with a cell-RNTI (C-RNTI). If the PDCCH relates to paging, the CRC may be masked with a paging-RNTI (P-RNTI). If the PDCCH relates to system information (e.g., system information block (SIB)), the CRC may be masked with a system information RNTI (SI-RNTI). If the PDCCH relates to a random access response, the CRC may be masked with a random access-RNTI (RA-RNTI).

Table 5 shows the usage of the PDCCH and transport channels according to the type of RNTI. Here, the transport channel means a transport channel related to data carried by a PDSCH/PUSCH scheduled by the PDCCH.

TABLE 5

| RNTI | Usage | Transport Channel |
|---|---|---|
| P-RNTI | Paging and System Information change notification | PCH (Paging Channel) |
| SI-RNTI | Broadcast of System Information | DL-SCH |
| RA-RNTI | Random Access Response | DL-SCH |
| Temporary C-RNTI | Contention Resolutions (when no valid C-RNTI is available) | DL-SCH |
| Temporary C-RNTI | Msg3 transmission | UL-SCH |
| C-RNTI MCS(Modulation and Coding Scheme)-C-RNTI | Dynamically scheduled unicast transmission | UL-SCH |
| C-RNTI | Dynamically scheduled unicast transmission | DL-SCH |
| MCS-C-RNTI | Dynamically scheduled unicast transmission | DL-SCH |
| C-RNTI | Triggering of PDCCH ordered random access | N/A |
| CS(Configned Scheduling)-RNTI | Configured scheduled unicast transmission (activation, reactivation and retransmission) | DL-SCH, UL-SCH |
| CS-RNTI | Configured scheduled unicast transmission (deactivation) | N/A |
| TPC(Transmit Power Control)-PUCCH-RNTI | PUCCH power control | NA |
| TPC-PUSCH-RNTI | PUSCH power control | N/A |
| TPC-SRS-RNTI | SRS trigger and power control | N/A |
| INT(Interruption)-RNTI | Indication pre-emption in DL | N/A |
| SFI(Slot Format Indication)-RNTI | Slot Format Indication on the given cell | N/A |
| SP(Sems-persistent)-CSI(Channel State Information)-RNTI | Activation of Semi-persistent CSI reporting on PUSCH | NA |

For the PDCCH, a fixed modulation scheme may be used (e.g., quadrature phase shift keying (QPSK)). One PDCCH may include 1, 2, 4, 8, or 16 control channel elements (CCEs) depending on the aggregation level (AL). One CCE may include 6 resource element groups (REGs), and one REG may be defined by one OFDMA symbol and one (P)RB.

The PDCCH may be transmitted in a control resource set (CORESET). The CORESET corresponds to a set of physical resources/parameters used to carry the PDCCH/DCI within a BWP. For example, the CORESET may include a set of REGs with a given numerology (e.g., SCS, CP length, etc.). The CORESET may be configured by system information (e.g., MIB) or UE-specific higher layer (e.g., RRC) signaling. For example, the following parameters/information may be used to configure the CORESET. One UE may be configured with one or more CORESETs, and a plurality of CORESETs may overlap in the time/frequency domain.

controlResourceSetId: this parameter/information indicates the identifier (ID) of the CORESET.

frequencyDomainResources: this parameter/information indicates frequency-domain resources of the CORESET. The frequency-domain resources may be indicated by a bitmap, and each bit corresponds to an RB group (=6 consecutive RBs). For example, the most significant bit (MSB) of the bitmap corresponds to the first RB group in the BWP. An RB group corresponding to a bit with a value of 1 may be allocated as a frequency-domain resource of the CORESET.

duration: this parameter/information indicates time-domain resources of the CORESET. The parameter/information duration may indicate the number of consecutive OFDMA symbols included in the CORESET. For example, duration has a value of 1-3.

cce-REG-MappingType: this parameter/information indicates a CCE-to-REG mapping type. An interleaved type and a non-interleaved type may be supported.

precoderGranularity: this parameter/information indicates a precoder granularity in the frequency domain.

tci-StatesPDCCH: this parameter/information indicates information (e.g., TCI-StateID) on a transmission configuration indication (TCI) state for the PDCCH. The TCI state may be used to provide a quasi-co-location (QCL) relationship between DL RS(s) in an RS set (TCI-state) and a PDCCH DMRS port.

tci-PresentInDCI: this parameter/information indicates whether a TCI field is included in DCI.

pdcch-DMRS-ScramblingID: this parameter/information indicates information used for initialization of a PDCCH DMRS scrambling sequence.

For PDCCH reception, the UE may monitor (e.g., blind decoding) a set of PDCCH candidates in the CORESET. The PDCCH candidate may mean CCE(s) monitored by the UE for PDCCH reception/detection. PDCCH monitoring may be performed in one or more CORESETs in an active DL BWP on each active cell in which the PDCCH monitoring is configured. The set of PDCCH candidates monitored by the UE may be defined as a PDCCH search space (SS) set. The SS set may be classified into a common search space (CSS) set or a UE-specific search space (USS) set.

Table 6 shows PDCCH search spaces.

TABLE 6

| Search Space | Type | RNTI | Use Case |
| --- | --- | --- | --- |
| Type0-PDCCH | Common | SI-RNTI on a primary cell | Broadcast of System Information |
| Type0A-PDCCH | Common | SI-RNTI on a primary cell | Broadcast of System Information |
| Type1-PDCCH | Common | RA-RNTI or TC-RNTI on a primary cell | Msg2, Msg4 in RACH |
| Type2-PDCCH | Comnon | P-RNTI on a primary cell | Paging System Information change notification |
| Type3-PDCCH | Comeon | INT-RNTI, SFI-RNTI, TPC-PUSCH-RNTI, TPC-PUCCH-RNTI, TPC-SRS-RNTI, C-RNTI, MCS-C-RNTI or CS-RNTI | Group signaling |
| UE Specific | UE Specific | C-RNTI, MCS-C-RNTI or CS-RNTI | UE signaling (e.g., PDSCH/PUSCH) |

The SS set may be configured by system information (e.g., MIB) or UE-specific higher layer (e.g., RRC) signaling. S (e.g., 10) SS sets or less may be configured in each DL BWP of a serving cell. For example, the following parameters/information may be provided for each SS set. Each SS set may be associated with one CORESET, and each CORESET configuration may be associated with one or more SS sets.

searchSpaceId: this parameter/information indicates the ID of the SS set.

controlResourceSetId: this parameter/information indicates the CORESET associated with the SS set.

monitoringSlotPeriodicityAndOffset: this parameter/information indicates a PDCCH monitoring periodicity (in a unit of slot) and a PDCCH monitoring offset (in a unit of slot)

monitoringSymbolsWithinSlot: this parameter/information indicates first OFDMA symbol(s) for PDCCH monitoring in a slot in which the PDCCH monitoring is configured. The first OFDMA symbol(s) are indicated by a bitmap, and each bit corresponds to each OFDMA symbol in the slot. The MSB of the bitmap corresponds to the first OFDM symbol in the slot. OFDMA symbol(s) corresponding to bit(s) with a value of 1 corresponds to the first symbol(s) in the CORESET in the slot.

nrofCandidates: this parameter/information indicates the number of PDCCH candidates (e.g., one of 0, 1, 2, 3, 4, 5, 6, and 8) for each AL (where AL={1, 2, 4, 8, 16}).

searchSpaceType: this parameter/information indicates whether the SS type is the CSS or USS.

DCI format: this parameter/information indicates the DCI format of a PDCCH candidate.

The UE may monitor PDCCH candidates in one or more SS sets in a slot according to the configuration of the CORESET/SS set. An occasion (e.g., time/frequency resource) to monitor PDCCH candidates is defined as a PDCCH (monitoring) occasion. One or more PDCCH (monitoring) occasions may be configured within a slot.

1. Control Channel Monitoring in High Frequency Band

The above description may be applied in combination with the methods proposed in the present disclosure to be described later, or may be supplemented to clarify the technical characteristics of the methods proposed in the present disclosure.

In addition, the methods to be described later may be equally applied to the above-described NR system (licensed band) or shared spectrum, and may be modified or replaced to fit the terms, expressions, structures, and the like defined in each system to implement the technical idea proposed in the present specification in the corresponding system.

In a NR system, multiple numerologies (or subcarrier spacing (SCS)) are supported to support a variety of 5G services. For example, a wide area in typical cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more. An NR frequency band up to Release 16 may be defined as two types of frequency ranges (FR1 and FR2) and may be configured as shown in Table 3. In addition, discussions are going on to support future NR systems in a frequency band defined in FR1/FR2 or higher (e.g., 52.6 GHz to 71 GHz).

A higher frequency band than FR1 and FR2 bands (e.g., 52.6 GHz to 114.25 GHz band, particularly 52.6 GHz to 71 GHz) may be referred to as FR2-2. Waveforms, SCS, CP length, timing, etc. defined for FR1 and FR2 in the existing NR system may not be applied to FR2-2.

SCS of 120 kHz, 480 kHz, and 960 kHz may be used for an operation of the NR in an FR2-2 band. In the case of SCS of 480 kHz and 960 kHz, the length of an OFDM symbol may be shorter than that of 120 kHz. For example, an OFDM symbol of 480 kHz is 1/4 the length of an OFDM symbol of 120 kHz, and an OFDM symbol of 960 kHz is 1/8 times of the length of an OFDM symbol of 120 kHz. For a short-length slot to which 480 kHz and 960 kHz are applied, when a PDCCH monitoring operation is performed in all slots, the UE may have a burden such as power consumption. Therefore, when SCS of 480 kHz and/or 960 kHz is configured, multi-slot PDCCH monitoring may be introduced.

Multi-slot PDCCH monitoring refers to an operation of performing PDCCH monitoring by determining blind decoding (BD)/control channel element (CCE) limits based on a plurality of consecutive slots and/or on a basis of a plurality of consecutive slots. In the conventional NR rel-15, BD/CCE limits may be determined in units of one slot, and in NR rel-16, BD/CCE limits may be determined in units of spans confined within one slot. The span may mean a PDCCH monitoring unit including consecutive symbols.

Hereinafter, PDCCH monitoring performed in units of slots may be expressed as per-slot monitoring, PDCCH monitoring performed in units of spans may be expressed as per-span monitoring, and PDCCH monitoring performed in units of slots-groups may be expressed as per-X monitoring.

BD limits refer to "Maximum number of monitored PDCCH candidates for a DL BWP with SCS configuration for a single serving cell" on the 3GPP standard, and CCE limits refer to "Maximum number of non-overlapped CCEs for a DL BWP with SCS configuration for a single serving cell" on the 3GPP standard.

A plurality of consecutive slots, which are a reference of multi-slot PDCCH monitoring, is referred to as a slot-group. A slot-group may include X consecutive slots, and BD/CCE limits may be defined in units of slot-groups. For example, for SCS of 480 kHz, BD/CCE limit per slot-group including X=4 slots may be defined. In addition, Y consecutive slots may be defined in a slot-group. There may be types of search space (SS) sets that are limited in such a way that PDCCH monitoring is performed only in Y slots. In a per-X monitoring operation, some parameters (e.g., periodicity, offset, or duration) of the SS set configuration need to be configured in units of X. For example, the periodicity may be configured as a value in units of slots in per-slot monitoring, but may be configured in units of X slots in per-X monitoring. For example, if X=8 is configured in a cell in which SCS of 960 kHz is used, a period value for per-X monitoring may include only a multiple of 8.

In addition, PDCCH monitoring may be performed only in Y consecutive slots in a slot-group including X consecutive slots. PDCCH monitoring may not be performed in slots other than the Y slots among the X slots.

A PDCCH corresponding to a specific SS set type may be monitored only in the Y slots, and a PDCCH corresponding to another SS set type may be monitored in the X slots.

PDCCH monitoring is performed by the UE per search space (SS) set. The SS set includes a common SS set and a UE-specific SS set. The common SS (CSS) set includes a Type0-PDCCH CSS set, a Type0A-PDCCH CSS set, a Type1-PDCCH CSS set provided by dedicated higher layer signaling, a Type1-PDCCH CSS set provided in SIB 1, Type2-PDCCH CSS sets, and Type3-PDCCH CSS sets.

SS set types that may be monitored in the X slots (hereinafter, Group 2 SS set or Group(2) SSs) may include, for example, a Type0-PDCCH CSS set, a Type0A-PDCCH CSS set, a Type2-PDCCH CSS set, a Type1-PDCCH CSS set provided in SIB 1. SS set types that may be monitored in the Y slots (hereinafter, Group 1 SS set or Group(1) SSs) may include a Type1-PDCCH CSS set provided by dedicated higher layer signalling, a Type3-PDCCH CSS set, and a USS set.

Figure 4:
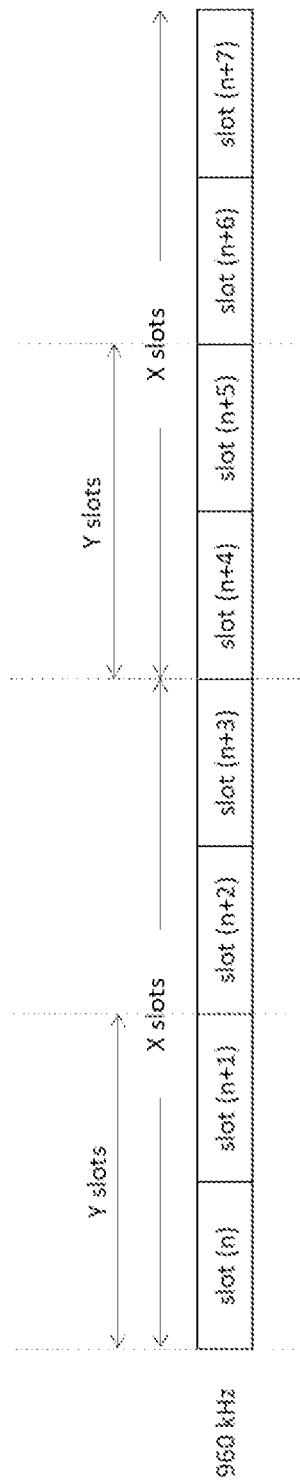
FIG. 4 shows a signal monitoring method according to an embodiment of the present disclosure.

FIG. 4 shows an example of monitoring of a PDCCH based on a combination of X and Y. In the example of FIG. 4, X=4 and Y=2. In FIG. 4, the PDCCH is monitored in a cell in which 960 kHz SCS is configured. Slot-groups with X=4 are non-overlapping and consecutive in the time domain. As an example, the first two slots among the X slots may be configured as the Y slots. In terms of position, the Y slots may be the two slots in the middle or the last two slots. Since the USS set is exemplified as a second SS set type, the PDCCH for the USS set may be monitored only in the Y slots, wihch are slot n, slot n+1, slot n+4, and slot n+5. In other words, a PDCCH monitoring occasion (MO) may be configured and/or positioned only in the Y slots.

Table 7 shows conventional operations for multi-slot monitoring.

TABLE 7

| Agreement (3GPP RAN1#107-e meeting) |
| --- |
| For Group (1) SS: Type 1 CSS with dedicated RRC configuration and type 3 CSS, UE specific SS |
|     A SS is monitored within Y consecutive slots within a slot groug of X slots |
|     The Y consecutive slots can be located anywhere within the slot group of X slots |
|       Note: There is no requirement to align the Y consecutive slots across UEs or with slot n0 |
|     The location of the Y consecutive slots within the slot group of X slot is maintained across different slot groups |
|     BD attempt for all Group (1) SSs are restricted to fall within the same Y consecutive slots |
| For Group (2) SS: Type 1 CSS without dedicated RRC configuration and type 0, 0A, and 2 CSS |
|     SS monitoring locations can be anywhere within a slot group of X slots, with the following exception |
|       BD attempts for Type0-CSS for SSB/CORESET 0 multiplexing pattern 1, and additionally forType0A/2-CSS if seachSpaceId = 0, occur in slots with index n0 and n0+X0, where n0 is as in Re1-15, X0=4 for 480 kHz SCS and X0=8 for 960 kHz SCS. |
| Supported combinations of (X,Y) |
|     A UE capable of multi-slot monitoring mandatorily supports |
|       For SCS 480 kHz: (X,Y) = (4,1) |
|       For SCS 960 kHz: (X,Y) = (8,1) |
|     A UE capable of multi-slot monitoring optionally supports |
|       For SCS 480 kHz: (X,Y) = (4,2) |
|       For SCS 960 kHz: (X,Y) = (8,4), (4,2), (4,1) |
|         Working assumption: BD/CCE budget for (4,2) (4,1) is half that of X=8 |
| A UE capable of multi-slot monitoring mandatorily supports the following PDCCH monitoring within Y slots |
|     For Y>1: FG3-1 (monitoring Group (1) SSs in the first 3 OFDM symbols of each of the Y slots) |
|     For 960 kHz SCS For Y=1: FG3-5b with set1 = (7, 3) |
|       [FL Note: The first number is the minimum gap in symbols between the start of two spans, the second number is the span duration in symbols (cf. TS 38.322)] |

TABLE 7-continued

Agreement (3GPP RAN1#107-e meeting)

For 480 kHz SCS For Y=1: FG3-5b with set2 = (4, 3) and (7, 3) with a modification with maximum two monitoring spans in a slot
   [FL Note: The first number is the minimum gap in symbols between the start of two spans, the second number is the span duration in symbols (cf. TS 33.822)]
   The following supersedes FG3-5b and FG3-1 definition:
      Processing one unicast DCI scheduling DL and one unicast DCI scheduling UL par slot groug of X slots per scheduled CC for FDD
      Processing one unicast DCI scheduling DL and 2 unicast DCI acleduling UL per slot group of X slots per scheduled CC for TDD Referring to Table 7, the number of X slots per slot-group supported in multi-slot monitoring and the number of Y slots for Group 1 SS set are configured for each SCS.

Table 8 shows conventional operations for SS set configuration.

TABLE 8

Agreemerst (3GPP RAN1#107bis-e meeting)

For search space set configuration of mults-slot PDCCH monitoring:
   monitoringSlotPeriodicityAndOffset and duration are appended with "-r17", and
      For monitoringPeriodicityAndOffset-r17
         The values represent slots
         Add periodicity values {32,64,128,5120,1240,20480} to the existing values in monitoringSlotPeriodicityAndOffset
           Note Total list of supported periodicity values:
           {1,2,4,5,8,10,16,20,32,40 64,80,128,160,320,640,1280,2560,5120,10240,20480}
         For each periodicity value Xp
           The value range for the offset O is {0 .. Xp-1} slots
           Note: There may be no seed to introduce the term "Xp" iss the specifications
         The configured periodicity at least for Group (1) SSs is restricted to be an integer multiple of Xs slots
         FFS: details of offset
      For duration-r17
         The values represent slots
         The value range is {8, 12, . . . ,20476}
         The configured duration is restricted to be an integer multiple of Xs slots at least for Group (1) SSs
         FFS: need to revise the definition of duration
   monitoringSymbolsWithinSlot applies to each slot in a slot group configured for multi-slot PDCCH monitoring
      Note: This parameter can be directly re-used from earlier releases.
   Introduce new parameter monitoringSlotsWithinSlotGroup-r17
      Working assumption:
         The size is 8 bits
         Each bit in monitoringSlotsWithinSlotGroup-r17 represents a slot in a slot group
         A slot in the slot group is configured for multi-slot PDCCH monitoring is the corresponding bit in the slot group is set to '1'
           Note: Further configuration of the monitoring symbols in such a slot is done by monitoringSymbolsWithinSlot
           The slots indicated is the bitmap should be consecutive at least for Group (1) SSs Referring to Table 8, the UE receives the SS set configuration for multi-slot monitoring from the BS through RRC signaling. The SS set configuration may include the following parameters.

monitoringSlotPeriodicityAndOffset-r17
   duration-r17
   monitoringSymbolsWithinSlot
   monitoringSlotsWithinSlotGroup-r17

Hereinafter, the operation and configuration method, restrictions, and the like for the parameters are described.

1-(1). monitoringSlotsWithinSlotGroup-r17

An RRC parameter, monitoringSlotsWithinSlotGroup-r17, is a parameter for multi-slot monitoring. For the slot-group length (i.e., slot-group size), whether a monitoring occasion (MO) may be present in each slot may be configured through a bitmap. A bitmap of X bitwidth may be used for each SCS. For example, each bit of an 8-bit bitmap for a cell to which a 960 kHz SCS is applied may indicate whether an MO of an SS is present for each of the 8 slots included in a slot group. A 4-bit bitmap for a cell to which 480 kHz SCS is applied may indicate whether an MO of an SS is present for each of the 4 slots included in a slot-group. In some descriptions below, in order to distinguish between X in the combination (X, Y) and X set by the BS, X provided by the BS through RRC configuration or the like may be denoted by L. For example, the slot-group size set by the BS for the UE through RRC configuration may be referred to as L, while the slot-group size by the combination (X, Y) reported to the BS by the UE or the combination (X, Y) that the UE assumes or determines based on the capacity thereof may be referred to as X.

In the proposed methods described below, it is assumed that an 8-bit bitmap is used for 480/960 kHz. However, the application of the proposed methods is not necessarily limited thereto. The same methods may be applied to bitmaps having other bitwidths (e.g., when the bitwidths depends on SCS).

[Definition of monitoringSlotsWithinSlotGroup-r17]

The absolute position of a slot (i.e., the position in each frame, the position in each subframe, a slot index) represented by each bit of the bitmap of monitoringSlotsWithinSlotGroup-r17 may be defined using one of the following methods. Hereinafter, the respective bits of the 8-bit bitmap are represented as {b0, b1, b2, b3, b4, b5, b6, b7}.

(Method 1) Each bit of the bitmap indicates whether an MO is present in each slot in a slot-group. The slot-group means the following: A first slot-group of a subframe represents X consecutive slots starting from the first slot in the subframe. Subsequent slot-groups are consecutive and non-overlapping with the first slot-group. The definition of monitoringSlotsWithinSlotGroup-r17 is divided into the case of X=8 and the case of X=4.

(Method 1-1) When X=8, the bit value of b0 indicates whether an MO is present in the first slot in each slot-group. Bits in the bitmap, b1, b2, . . . , and b7, are mapped to subsequent slots from the second slot in the slot-group, respectively. For example, b1 indicates whether an MO is present in the slot next to the slot mapped to b0, and b2 indicates whether an MO is present in the slot next to the slot mapped to b1. Bits b3 to b6 are sequentially mapped to subsequent slots in the slot-group, respectively, and b7 indicates whether an MO is present in the last slot in the slot-acceptedgroup.

(Method 1-2) When X=4, the bit value of b0 indicates whether an MO is present in the first slot in each slot-group. Subsequent slots from the second slot are sequentially mapped to bits b1, b2, and b3, and b4, b5, b6, and b7 are not used. For example, the UE ignores bit values carried by b4, b5, b6, and b7.

(Method 1-3) When X=4, the meaning of {b0, b1, b2, b3} is the same as that in Method 1-2. Therefore, the bit value of b0 indicates whether an MO is present in the first slot in each slot-group. Subsequent slots from the second slot are sequentially mapped to b1, b2, and b3. Unlike in Method 1-2, {b4, b5, b6, b7} is set as b4=b0, b5=b1, b6=b2, and b7=b3, respectively.

(Method 1-4) When X=4, the bit value of b0 indicates whether an MO in the first slot among the 8 slots in {slot-group #(n), slot-group #(n+1)}, wihch are two consecutive slot-groups. Subsequent slots from the second slot are sequentially mapped to b1, b2, . . . , and b7. Thus, {b0, b1, b2, b3} is mapped to 4 slots in slot-group #(n), respectively, and {b4, b5, b6, b7} is mapped to 4 slots in slot-group #(n+1), respectively. Slot-group #(n) may denote the 1st, 3rd, 5th, . . . slot-groups from the start of the subframe, or the 2nd, 4th, 6th, . . . slot-groups.

(Method 1-5) When X=4, the bit value of b0 indicates whether an MO is present in the first slot in each slot-group. Subsequent slots from the second slot are sequentially mapped to b2, b4, and b6. Also, b1, b3, b5, and b7 are set as b1=b0, b3=b2, b5=b4, and b7 =b6, respectively.

(Method 1-6) When X=4, the meaning of {b0, b1, b2, b3} is the same as that in Method 1-2. Therefore, the bit value of b0 indicates whether an MO is present in the first slot in each slot-group. Subsequent slots from the second slot are sequentially mapped to b1, b2, and b3. The bits are fixed as {b4, b5, b6, b7}={1, 1, 1, 1}.

(Method 1-7) When X=2, the bit value of b0 indicates whether an MO is present in the first slot in each slot-group. The bit value of b1 indicates whether an MO is present in the second slot in the slot-group. Bits b2, b3, b4, b5, b6, b7 are not used.

(Method 1-8) When X=2, the meaning of {b0, b1} is the same as that in Method 1-7. Therefore, the bit value of b0 indicates whether an MO is present in the first slot in each slot-group. The bit value of b1 indicates whether an MO is present in the second slot in the slot-group. {b2, b3, b4, b5, b6, b7} is set as b2=b0, b3=b1, b4=b0, b5=b1, b6=b0, and b7=b1 respectively.

(Method 1-9) When X=2, the bit value of b0 indicates whether an MO is present in the first slot among the eight slots in {slot-group #(n), slot-group #(n+1), slot-group #(n+2), slot-group #(n+3)}, which are four consecutive slot groups. Subsequent slots from the second slot are sequentially mapped to b1, b2, . . . , and b7. {b0, b1} are mapped to two slots in slot-group #(n), respectively. {b2, b3} are mapped to two slots in slot-group #(n+1), respectively. {b4, b5} are mapped to two slots in slot-group #(n+2), respectively. {b6,b7} are mapped to two slots in slot-group #(n+3), respectively. Slot-group #(n) may represent the 1st, 5th, 9th, . . . slot-groups from the start of the subframe, but is not necessarily limited thereto.

(Method 1-10) When X=2, the bit value of b0 indicates whether an MO is present in the first slot in each slot-group. Bits are set as b3=b2=b1=b0. b4 indicates whether an MO is present in the second slot in each slot-group. The bits are set as b7=b6=b5=b4.

(Method 1-11) When X=2, the meaning of {b0,b1} is the same as that in Method 1-7. Accordingly, the bit value of b0 indicates whether an MO is present in the first slot in each slot-group. The bit value of b1 indicates whether an MO is present in the second slot in the slot-group. Bits are fixed as {b2, b3, b4, b5, b6, b7}={1, 1, 1, 1, 1, 1}.

(Method 2) Bits of the bitmap indicate whether an MO is present in 8 consecutive slots starting from the earliest slot after the offset set by monitoringSlotPeriodicityAndOffset-r17. However, when X=4, whether an MO is present in 4 slots may be indicated according to a method. The periodicity set by monitoringSlotPeriodicityAndOffset-r17 is denoted by k_s and the offset value by o_s.

(Method 2-1) When X=8, the bit value of b0 indicates whether an MO is present in slot #(n_(s,f)^μ) and slot #(n_(s,f)^μ+8*k), which are determined by (n_f*N_(slot)^(frame, μ)+n_(s,f)^μ-o_s) mod k_s=0, where k may be a natural number greater than or equal to 1, such as k=1,2, 3, . . . b1, b2, . . . , and b7 are sequentially mapped to subsequent slots from the slot next to the slot mapped to b0. For example, b1 indicates whether an MO is present in a slot next to the slot mapped to b0, and b2 indicates whether an MO is present in a slot next to the slot mapped to b1. Also, b3 to b7 are sequentially mapped to slots in the slot-group.

(Method 2-2) When X=4, the bit value of b0 indicates whether an MO is present in slot #(n_(s,f)^μ) and slot #(n_(s,f)^μ+4*k), which are determined by (n_f*N_(slot)^(frame, μ)+n_(s,f)^μ-o_s) mod k_s=0, where k may be a natural number greater than or equal to 1, such as k=1,2, 3, . . . b1, b2, and b3 are sequentially mapped to subsequent slots from the slot next to the slot mapped to b0. b4, b5, b6, and b7 are not used. For example, the UE ignores bit values carried by b4, b5, b6, and b7.

(Method 2-3) When X=4, the meaning of {b0, b1, b2, b3} is the same as that in Method 2-2. Accordingly, the bit value of b0 indicates whether an MO is present in slot #(n_(s,f)^μ) and slot #(n_(s,f)^μ+4*k), which are determined by (n_f*N_(slot)^(frame, μ)+n_(s,f)^μ-o_s) mod k_s=0, where k may be a natural number greater than or equal to 1, such as k=1,2, 3, . . . b1, b2, and b3 are sequentially mapped to subsequent slots from the slot next to the slot mapped to b0. {b4, b5, b6, b7} is set as b4=b0, b5=b1, b6=b2, and b7=b3, respectively.

(Method 2-4) When X=4, the meaning of {b0, b1, b2, b3} is the same as that in Method 2-2. Accordingly, the bit value of b0 indicates whether an MO is present in slot #(n_(s,f)^μ) and slot #(n_(s,f)^μ+4*k), which are determined by (n_f*N_(slot)^(frame, μ)+n_(s,f)^μ-o_s) mod k_s=0, where k may be a natural number greater than or equal to 1, such as k=1, 2, 3, . . . b1, b2, and b3 are sequentially mapped to subsequent slots from the slot next to the slot mapped to b0. {b4, b5, b6, b7} indicates whether an MO is present in slots having indexes greater by +1, +2, +3, and +4 than the slot mapped to b3, respectively.

(Method 2-5) When X=4, the meaning of b0 is the same as that in Method 2-2, and b2, b4, b6 are sequentially mapped to slots subsequent to the slot indicated by b0. Also, b1, b3, b5, and b7 are set as b1=b0, b3=b2, b5=b4, b7=b6, respectively.

(Method 2-6) When X=4, the meaning of {b0, b1, b2, b3} is the same as that in Method 2-2. Accordingly, the bit value of b0 indicates whether an MO is present in slot #(n_(s,f)^μ) and slot #(n_(s,f)^μ+4*k), which are determined by (n_f*N_(slot)^(frame, μ)+n_(s,f)^μ-o_s) mod k_s=0, where k may be a natural number greater than or equal to 1, such as k=1, 2, 3, . . . Also, b1, b2, and b3 are sequentially mapped to subsequent slots from the slot next to the slot mapped to b0. {b4, b5, b6, b7} is fixed as {b4,b5,b6,b7}={1,1,1,1}.

(Method 2-7) When X=2, the bit value of b0 indicates whether an MO is present in slot #(n_(s,f)^μ) and slot #(n_(s,f)^μ+2*k), which are determined by (n_f*N_(slot)^(frame, μ)+n_(s,f)^μ-o_s) mod k_s=0, where k may be a natural number greater than or equal to 1, such as k=1, 2, 3, . . . b1 indicates whether an MO is present in slot #(n_(s,f)^μ+1) and slot#(n_(s,f)^μ+1+2*k). b2, b3, b4, b5, b6, b7 are not used. For example, the UE ignores bit values carried by b2, b3, b4, b5, b6, and b7.

(Method 2-8) When X=2, the meaning of {b0,b1} is the same as in Method 2-7. Accordingly, the bit value of b0 indicates whether an MO is present in slot #(n_(s,f)^μ) and slot #(n_(s,f)^μ+2*k), which are determined by (n_f*N_(slot)^(frame, μ)+n_(s,f)^μ-o_s) mod k_s=0, where k may be a natural number greater than or equal to 1, such as k=1, 2, 3, . . . b1 indicates whether an MO is present in slot #(n_(s,f)^μ+1) and slot#(n_(s,f)^μ+1+2*k). {b2, b3, b4, b5, b6, b7} is set as b2=b0, b3=b1, b4=b0, b5=b1, b6=b0, b7=b1, respectively.

(Method 2-9) When X=2, the meaning of {b0, b1} is the same as in Method 2-7. Accordingly, the bit value of b0 indicates whether an MO is present in slot #(n_(s,f)^μ) and slot #(n_(s,f)^μ+2*k), which are determined by (n_f*N_(slot)^(frame, μ)+n_(s,f)^μ-o_s) mod k_s=0, where k may be a natural number greater than or equal to 1, such as k=1, 2, 3, . . . b1 indicates whether an MO is present in slot #(n_(s,f)^μ+1) and slot#(n_(s,f)^μ+1+2*k). Each bit value of {b2, b3, b4, b5, b6, b7} indicates whether an MO is present in slots having indexes greater by +1, +2, +3, +4, +5, and +6 than the slot mapped to b1, respectively.

(Method 2-10) When X=2, the meaning of {b0,b1} is the same as in Method 2-7. Accordingly, the bit value of b0 indicates whether an MO is present in slot #(n_(s,f)^μ) and slot #(n_(s,f)^μ+2*k), which are determined by (n_f*N_(slot)^(frame, μ)+n_(s,f)^μ-o_s) mod k_s=0, where k may be a natural number greater than or equal to 1, such as k=1, 2, 3, . . . Bits are set as b3=b2=b1=b0. The bit value of b4 indicates whether an MO is present in the slot next to the slot corresponding to b0. Bits are set as b7=b6=b5=b4.

(Method 2-11) When X=2, the meaning of {b0, b1} is the same as in Method 2-7. Accordingly, the bit value of b0 indicates whether an MO is present in slot #(n_(s,f)^μ) and slot #(n_(s,f)^μ+2*k), which are determined by (n_f*N_(slot)^(frame, μ)+n_(s,f)^μ-o_s) mod k_s=0, where k may be a natural number greater than or equal to 1, such as k=1, 2, 3, . . . b1 indicates whether an MO is present in slot #(n_(s,f)^μ+1) and slot#(n_(s,f)^μ+1+2*k). {b2, b3, b4, b5, b6, b7} is fixed as {b2, b3, b4, b5, b6, b7}={1, 1, 1, 1, 1, 1}.

The methods in section 1-(1) are defined for X=4 or X=8, respectively. When the UE performs multi-slot monitoring, a bitmap based on a combination of one or more of the above methods may be defined based on X set for the UE. The UE may operate based on the defined bitmap. In the case where it is reported that the UE is capable of using both X=4 and/or X=8, the UE may infer whether the set value of X is X=4 or X=8 from the set bitmap value. Specifically, when the union of MOs is obtained by combining the bitmaps of all SS sets for the Group 1 SS set configured for the UE, X (or the combination (X, Y)), which a criterion for monitoringSlotsWithinSlotGroup-r17, may be inferred based on whether the obtained union is included in the Y slots of the (X, Y) combination including X=4 or in the Y slots of the (X, Y) union including X=8. When the union of MOs is included in the Y slots for two or more (X, Y) unions, a rule allowing the UE to select one (X, Y) union from among the two or more (X, Y) unions is needed. In this case, the UE may perform selection based on (X, Y) including the default X (or default/mandatory (X, Y) union) or the largest X among the values of X available to the UE. Alternatively, in the case where the UE does not need to select even Y, the UE may select the largest X (or default X).

For example, when the union of MOs configured for the UE operating at 960 kHz is aligned with both (4,1) and (8,1) among the unions of (X, Y), the UE may select (8,1), which has the greater value, as the criterion.

As another example, when the union of MOs configured for the UE operating at 960 kHz is aligned with all of (4, 1), (8, 1), and (8, 4) among the unions of (X, Y), the UE may select X=8. When the UE needs to select a combination (X, Y), the UE may select (8, 1) as a combination (X, Y) to be used as the criterion for the bitmap and perform multi-slot monitoring.

Additionally, referring to Tables 7 and 8, the UE may expect that '1's in the bitmap are configured only in a consecutive form for Group (1) SS. However, in the case of Method 1-4 or Method 2-4, the UE may expect that '1's in the bitmap may not be consecutive regardless of the SS set type.

[Validity of the Parameter for monitoringSlotsWithinSlotGroup-r17]

When the UE operates based on a mandatory combination (X, Y), the UE (a UE that is not capable of Optional (X, Y)) may not use the parameter monitoringSlotsWithinSlotGroup-r17. Since Y=1 for all Mandatory (X, Y), the UE may not use the parameter monitoringSlotsWithinSlotGroup-r17 in this case. The UE may expect that the parameter monitoringSlotsWithinSlotGroup-r17 is not configured. Even if the parameter is configured, that UE may ignore the same. When the parameter monitoringSlotsWithinSlotGroup-r17 is not used, the UE may operate assuming that the MO position is a slot corresponding to b0 defined with Methods 1 and 2 above. Alternatively, when the parameter monitoringSlotsWithinSlotGroup-r17 is defined with Method 1, the MO may be configured in the first slot of the slot-group (only within the duration). Alternatively, when the parameter monitoringSlotsWithinSlotGroup-r17 is defined with Method 2, the MO may be periodically configured from the first slot after the offset (within the duration). When the parameter monitoringSlotsWithinSlotGroup-r17 is defined with Method 2, the periodicity may be 4 slots/8 slots for each of 480 kHz/96 kHz. Alternatively, the periodicity may be equal to the length of the slot-group.

A UE capable of using a union of Optional (X, Y) may expect the parameter monitoringSlotsWithinSlotGroup-r17 to be configured. The UE may determine the MO position through Method 1 and/or Method 2 based on the configured bitmap.

Alternatively, the parameter monitoringSlotsWithinSlotGroup-r17 may not be configured even for the UE capable of using the union of Optional (X, Y) when Y=1 in the (X, Y) combination.

For example, when the UE supports multi-slot monitoring according to (X, Y)=(4, 1) for 960 kHz SCS, the parameter monitoringSlotsWithinSlotGroup-r17 may not be configured for the corresponding SS set. In this case, MOs, monitoring slots, monitoring symbols, and/or the span of MOs may be determined by an offset set for the corresponding SS set. As another example, for a 480 kHz SCS, the parameter monitoringSlotsWithinSlotGroup-r17 may not be configured even for (X, Y)=(2, 1), and the MO may be determined by the offset.

In addition, when monitoringSlotsWithinSlotGroup-r17 is not configured for a specific SS set, the UE may operate assuming that the corresponding SS set is configured based on Y=1. That is, for (X, Y) that is the criterion for configuring a specific SS set, whether Y is Y=1 or Y=1 may be implicitly indicated to the UE through the status of configuration of the parameter monitoringSlotsWithinSlotGroup-r17. Alternatively, based on the parameter monitoringSlotsWithinSlotGroup-r17 not being configured, the UE operate assuming that SS sets are configured based on Y=1 in a corresponding cell (or a bandwidth part (BWP) in which the corresponding SS set is included/configured, or a search space set group (SSSG) in which the corresponding SS set is included/configured).

As an example, in the case where a UE operating with 480 kHz SCS reports that the UE is capable of using (4, 1) and (4, 2) among the unions of (X, Y), the UE operates assuming that the SS set configured for the corresponding cell (or BWP or SSSG) is configured based on (4, 1) if the parameter monitoringSlotsWithinSlotGroup-r17 is not configured for any of the SS sets configured in the corresponding cell (or BWP or SSSG). If the parameter monitoringSlotsWithinSlotGroup-r17 is configured for one or more SS sets, the UE may operate assuming that the SS set configured in the corresponding cell (or BWP or SSSG) is configured based on (4, 2).

As another example, in the case where a UE operating with 960 kHz SCS reports that the UE is capable of using (8,1), (8, 4), (4, 2), and (4,1) among the unions of (X, Y), the UE operates assuming that the SS set configured for the corresponding cell (or BWP or SSSG) is configured based on (8, 1) or (4, 1) if the parameter monitoringSlotsWithinSlotGroup-r17 is not configured for any of the SS sets configured in the corresponding cell (or BWP or SSSG). If the parameter monitoringSlotsWithinSlotGroup-r17 is configured for one or more SS sets, the UE may operate assuming that the SS set configured in the corresponding cell (or BWP or SSSG) is configured based on (8, 4) or (4, 2). In addition, in a situation where it is necessary to assume that the SS set is configured based on one of the two unions of (8, 4) or (4, 2), the UE may operate assuming that mandatorily supported (X, Y) or (X, Y) including the largest X (or having the largest BD/CCE budget). Therefore, the UE may assume that (8, 1), which is a mandatorily supported union configured between (8, 1) or (4, 1). Alternatively, the UE may operate assuming that a (X, Y) union with a larger BD/CCE budget between (8, 1) or (4, 1) is configured. Also, the UE may operate assuming that the (8, 4) union having a larger BD/CCE budget between (8, 4) or (4,2) is configured.

[Default Value of the Parameter 'monitoringSlotsWithinSlotGroup-r17']

'10000000' may be used as a default value of monitoringSlotsWithinSlotGroup-r17. When monitoringSlotsWithinSlotGroup-r17 is not configured by the BS, the UE may operate assuming the default value. Alternatively, the default value may include only one '1'. If the default value includes two or more '1's, the value of the first bit, which is the position of b0, may be '1'.

[Selection of an Active (X, Y) When a UE are Capable With Multiple (X, Y)]

When the UE reports to the BS that the UE is capable of using a plurality of (X, Y) combinations, the BS should determine X and/or (X, Y) that is a criterion for configuring monitoringSlotsWithinSlotGroup-r17. In addition, when the configured bitmap monitoringSlotsWithinSlotGroup-r17 matches two or more X (or (X, Y)), the UE needs to determine X and/or (X, Y) that is a criterion for configuring the configured monitoringSlotsWithinSlotGroup-r17 to perform multi-slot monitoring.

In this case, the UE (and/or the BS) may combine the bitmaps of all SS sets belonging to the Group 1 SS set configured for the UE to obtain a union of MOs, and then infer X (or a combination (X, Y)) that is a criterion for monitoringSlotsWithinSlotGroup-r17 based on whether the union is included in the Y slots of the (X, Y) combination including X=4 or in the Y slots of the (X, Y) combination including X=8. When the union of MOs is included in the Y slots for two or more (X, Y) combinations, a rule allowing the UE to select one (X, Y) combination is needed. In this case, the UE may perform selection based on (X, Y) including the default X (or default/mandatory (X, Y) combination) or the largest X among the values of X available to the UE. Alternatively, in the case where the UE does not need to select even Y, the UE may select the largest X (or default X)

For example, when the union of MOs configured for the UE operating at 960 kHz is aligned with both (4,1) and (8,1) among the unions of (X, Y), the UE may select (8,1), which has the greater value, as the criterion.

As another example, when the union of MOs configured for the UE operating at 960 kHz is aligned with all of (4, 1), (8, 1), and (8, 4) among the unions of (X, Y), the UE may select X=8. When the UE needs to select a combination (X, Y), the UE may select (8, 1) as a combination (X, Y) to be used as the criterion for the bitmap and perform multi-slot monitoring.

Alternatively, the UE (and/or the BS) may determine that the bitmap is configured based on the default X (or the (X, Y) union including the default X or the default (X, Y) union).

The above-described rule may be applied only to a specific SS set type (e.g., Group(1) SS), but may be applied regardless of SS set types (i.e., including Group(2) SS).

Separately, regarding the periodicity and offset set by monitoringSlotPeriodicityAndOffset-r17 and/or the duration set by duration-r17, when the UE reports a plurality of Xs (or (X, Y) combinations), the periodicity, offset, and/or duration set for the UE match two or more Xs (or (X, Y)), the UE should determine one of Xs (or (X, Y)) and perform multi-slot monitoring. In this case, the UE may determine that the periodicity, offset, and/or duration have been set based on the default X. This rule may be applied to a specific SS set type (particularly, Group(2) SS).

1-(2). duration-r17 duration-r17 is a parameter for multi-slot monitoring. duration-r17 may indicate a duration of a slot (where the MO is positioned) in which the UE may actually perform monitoring within the periodicity that is set based on monitoringSlotPeriodicityAndOffset-r17. The UE may perform monitoring only during the slots the number of which is set by the parameter duration-r17, starting after the offset within the periodicity. However, as described above, the MO position for the SS set type belonging to the Group (1) SS may be limited to the Y slots within the slot-group. When duration-r17 is set in units of slots, there may be limitations in limiting the position of the MO to the Y slots using only duration-r17. Therefore, the following method is proposed.

[Definition of duration-r17]

duration-r17 is defined as the number of consecutive slots in which the MO may be present within the periodicity (or the number of consecutive slots that SearchSpace lasts in every occasion) for the periodicity and offset set by monitoringSlotPeriodicityAndOffset-r17, and indicates the number of slots after the offset. However, the MO may be present only in slots in which the bitmap value of monitoringSlotsWithinSlotGroup-r17 corresponds to '1', and the UE skips PDCCH monitoring in slots corresponding to '0'. This restriction may be limited to some SS set types (e.g., SS set types corresponding to Group (1) SSs) or may be applied to all SS set types in common. Also, the MO is not configured in slots that are not configured as slots for PDCCH monitoring based on the offset and duration even in the slot-group, even when the corresponding bit value of the bitmap of monitoringSlotsWithinSlotGroup-r17 is set to '1'. . The UE skips PDCCH monitoring in slots in which the MO is not configured.

[Default Value of the Parameter 'duration-r17']

X may be used as the default value of duration-r17. When X (or a combination (X, Y)) for each SCS for multi-slot monitoring is separately indicated by RRC configuration or the like, the set X may be the default value of duration-r17. In the present disclosure, in order to distinguish between X of the combination (X, Y) and the set X, X provided through the RRC configuration or the like may be denoted as L. For example, the slot-group size set by the BS for the UE through RRC configuration or the like may be referred to as L, while the slot-group size by the combination (X, Y) reported by the UE to the BS or the combination (X, Y) that the UE assumes or determines based on the capacity thereof may be referred to as X. In some implementations of the present disclosure, when X set through an indication such as RRC configuration is referred to as L, L may be the default value of duration-r17.

Alternatively, regardless of a separate indication of X, a default value of duration-r17 may be defined for each SCS.

For example, the default value of duration-r17 may be defined as '4' for 480 kHz and may be defined as '8' for 960 kHz.

[Maximum Valid Duration of the Parameter 'duration-r17']

When duration-r17 may only be set as a multiple of X for a specific SS set type (e.g., Group (1) SS), the maximum valid duration may be defined as 'Xp-X'. Here, when X (or a combination (X, Y)) for each SCS for multi-slot monitoring is separately indicated by RRC configuration or the like, 'X' may be 'X' set by the indication. As mentioned above, in the present disclosure, X provided through RRC configuration or the like is denoted as L to distinguish between X of the combination (X, Y) and the set X. For example, the slot-group size set by the BS for the UE through RRC configuration or the like may be referred to as L, and the combination (X, Y) reported by the UE to the BS or the UE assumes or The slot-group size by the combination (X, Y) that determines may be referred to as X.

Alternatively, when there is no indiciation such as a separate RRC configuration, the UE may assume X maching an SS set (or MO) configured for the corresponding cell (or BWP or SSSG) (i.e., the slot-group size L configured for the SS set or MO (by, for example, the bitmap monitoringSlotsWithinSlotGroup-r17)) or X having the largest BD/CCE budget among a plurality of combinations (X, Y) reported by the UE as combinations that the UE is capable of using. In this case, 'Xp-X' may be determined based on the assumed X.

Alternatively, regardless of a separate X indication, the maximum valid duration may be defined as 'Xp-4' for 480 kHz and 'Xp-8' for 960 kHz for each SCS. Here, Xp denotes a periodicity set by monitoringSlotPeriodicityAndOffset-r17.

In some implementations disclosed in the present disclosure, the UE and the BS may determine that a value greater than the maximum valid value is not valid even when duration-17 is configured for the SS set. For example, when monitoringSlotPeriodicityAndOffset-r17=8 and duration-r17=8 or monitoringSlotPeriodicityAndOffset-r17=16 and duration-r17=16 for the SS set, slots that UEs should monitor for each SCS, each cell/BWP or each SS set may be the same, or UEs may need to monitor all slots for each cell/BWP or each SS set. This situation may increase the probability of PDCCH blocking or increase UE power consumption because the UE needs to monitor every slot. According to some implementations of the present disclosure, the probability of PDCCH blocking for the SS set may be reduced, and UE power consumption may be reduced by allowing the UE to skip monitoring as long as at least i) the size L of the slot-group configured for the SS set or ii) the indication size X for the SCS of the corresponding cell, within at least a periodicity of Xp configured for the SS.

[Parameter Description of 3GPP TS 38.331]

Table 9 shows an example described in 3GPP TS 38.331 regarding the default value and maximum valid duration of duration-r17.

TABLE 9

If the field is absent, the UE applies the value 4 slots for 480 kHz or 8 slots for 960 kHz, except for DCI format 2_0. The UE ignores this field for DCI format TABLE 9-continued 2_0. The maximum valid duration is periodicity-4 for 480 kHz or periodicity-8 for 960 kHz (periodicity as given in the monitoringSlotPeriodicityAndOffset-r17)

1-(3). SS Set Configurations for DCI Format 2_0

The SS set configuration method and operation method proposed in sections 1-(1) and 1-(2) may be applied to SS sets associated with all DCI formats. However, in the case of DCI format 2_0, there is a separate restriction different from those for other DCI formats regarding the periodicity, duration, and the like in Rel-15/16. Therefore, a separate restriction may be required for the MO associated with DCI format 2_0 even for SS set configuration for multi-slot monitoring.

[duration-r17 for DCI 2_0]

In Rel-15/16, the value of the druation parameter is limited to 1 for the SS set associated with DCI format 2_0. The reason is that information carried by DCI 2_0 during one periodicity does not need to be configured frequently. For multi-slot monitoring, monitoring is performed per slot-group. To this end, the following operation may be defined for a new parameter duration-r17.

duration-r17 for DCI 2_0 is limited to 1 slot (within the configured periodicity).

Alternatively, duration-r17 for DCI 2_0 is limited to X slots (within the configured periodicity).

That is, separate duration-r17 is not configured for DCI 2_0, and the value of the druation parameter may be limited to 1 slot (or X slots) within the periodicity configured by monitoringSlotPeriodicityAndOffset-r17. When duration-r17 is configured for DCI 2_0, the UE may operate according to the value of the configured druation parameter instead of the default operation.

[monitoringSlotsWithinSlotGroup-r17 for DCI 2_0]

Similarly to duration-r17, monitoringSlotsWithinSlotGroup-r17 indicating an MO pattern within a slot-group is not configured for the SS set associated with DCI 2_0. In this case, the following description may be disclosed in 3GPP TS 38.331.

"The UE ignores monitoringSlotsWithinSlotGroup-r17 for DCI format 2_0"

However, when monitoringSlotsWithinSlotGroup-r17 is configured for DCI 2_0, the UE may operate according to the configured bitmap, rather than perforeming the default operation in the above description. In this case, monitoringSlotsWithinSlotGroup-r17 for DCI 2_0 may be configured in a manner in which the value of only 1 bit is '1' and the values of the remaining 7 bits are '0' in the 8-bit bitmap. As a default form of the 8-bit bitmap, '10000000' may be used.

[Monitoring slots for DCI 2_0]

A monitoring slot for DCI format 2_0 may be limited to 1 slot within a periodicity configured by monitoringSlotPeriodicityAndOffset-r17 (which is similar to the scheme in Rel-15/16). Alternativley or additionally, one slot in which the MO is present within the periodicity may be restricted to be selected only from among the Y slots in the slot-group.

One slot may be selected accoridng to one of the following methods.

The first slot within the periodicity configured for DCI 2_0 may be selected.

The most preceding slot among the Y slots positioned within the periodicity configured for DCI 2_0 may be selected.

Alternatively, in connection with monitoringSlotsWithinSlotGroup-r17 and duration-r17, one slot may be determined as follows.

When monitoringSlotsWithinSlotGroup-r17 is configured and duration-r17 is set to 1 slot, the one slot may be determined as the most preceding slot with monitoringSlotsWithinSlotGroup-r17='1' after the offset.

When monitoringSlotsWithinSlotGroup-r17 is configured and duration-r17 is 4 slots (for 480 kHz) or 8 slots (for 960 kHz), the one slot may be determined as the most preceding slot with monitoringSlotsWithinSlotGroup-r17='1'.

When monitoringSlotsWithinSlotGroup-r17 is not configured, the one slot may be determined as the most preceding slot among the Y slots of the SS set associated with DCI 2_0 overlapping with the Y slots of an SS set different from the SS set associated with DCI 2_0, corresponding to the Group (1) SS configured for the UE.

A slot having monitoringSlotsWithinSlotGroup-r17='1' means a slot corresponding to a bit whose value is 1 among the bits constituting the bitmap of monitoringSlotsWithinSlotGroup-r17.

The content of the present disclosure is not limited only to transmission and reception of uplink and/or downlink signals. For example, the content of the present disclosure may be used in direct communication between UEs. In addition, a BS in the present disclosure may be a concept including a relay node as well as a BS. For example, an operation of the BS in the present disclosure may be performed by the BS, but may also be performed by the relay node.

Since examples of the above-described proposed method may also be included as one of the implementation methods of the present disclosure, it is obvious that the examples may be regarded as a kind of proposed method. In addition, the above-described proposed methods may be implemented independently, but may also be implemented in the form of a combination (or merge) of some of the proposed methods. Rules may be defined in such a way that information on whether the proposed methods are applied (or information on the rules of the proposed methods) is informed by the BS to the UE or by a transmitting UE to a receiving UE through a predefined signal (e.g., a physical layer signal or a higher layer signal).

Implementation Example(s)

Figure 5:
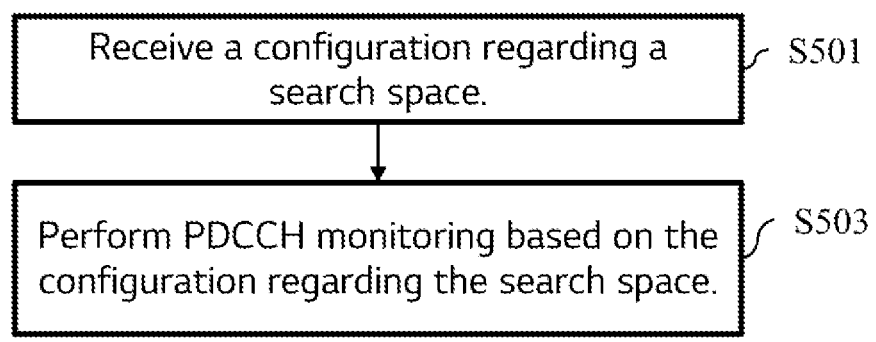
FIGS. 5 and 6 are flowcharts of signal transmission and reception methods according to an embodiment of the present disclosure.
Figure 6:
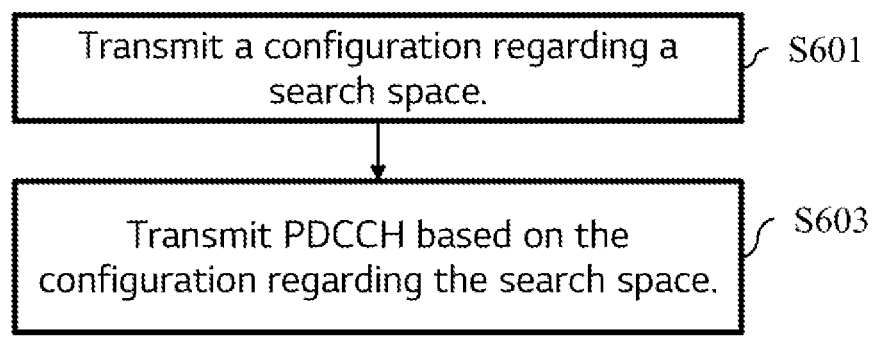

FIGS. 5 and 6 are flowcharts of signal transmission and reception methods according to an embodiment of the present disclosure. Specifically, FIG. 5 illustrates a flow of signal transmission and reception by a UE, and FIG. 6 illustrates a flow of signal transmission and reception by a BS.

Referring to FIG. 5, the implementation(s) of the present disclosure may be carried out by the UE, and may include receiving a configuration related to a search space (i.e., a configuration related to a search space set) (S501), and monitoring a PDCCH based on the configuration (S503). Referring to FIG. 6, the implementation(s) of the present disclosure may be carried out by the BS, and may include transmitting a configuration related to a search space (i.e., a configuration related to a search space set) (S601), and transmitting a PDCCH based on the configuration (S603).

In addition to the operations of FIG. 5 or 6, one or more of the operations described in Section 1 may be additionally performed by the UE or the BS.

According to Section 1, multi-slot PDCCH monitoring for monitoring only some consecutive slots in each of one or more consecutive slot-groups each including a plurality of consecutive-slots may be performed by the UE. Referring to FIG. 4, in multi-slot PDCCH monitoring, the slot-groups may be consecutively repeated without overlapping with each other.

Referring to FIG. 5 or 6, the BS transmits a configuration related to a search space (or a configuration related to a search space set) for a BWP of a cell to the UE. The BS may transmit PDCCH(s) in the BWP based on the configuration, and the UE may perform PDCCH monitoring in the BWP based on the configuration.

The configuration related to the search space include: (i) a first parameter related to the periodicity and offset of the PDCCH monitoring for the search space, (ii) a second parameter related to D as a number of consecutive slots where the search space can exist, and (iii) a third parameter related to L as a size of a slot-group configured for the search space. In some implementations, the first parameter may be monitoringSlotPeriodicityAndOffset-r17. In some implementations, the second parameter may be duration-r17. In some implementations, the third parameter may include a bitmap monitoringSlotsWithinSlotGroup-r17 indicating a slot configured for the PDCCH monitoring in the slot-group. In some implementations, L may be equal to the length of the bitmap.

Referring to Section 1-(2), the parameter duration-r17 may be set to a multiple of the indicated/set value of L through RRC configuration. In addition, the maximum valid duration of duration-r17 may be Xp-L. In other words, the maximum valid value of the second parameter may be a value obtained by subtracting the set value of the size L of the slot-group from the value of the periodicity based on the first parameter. In some implementations, the second parameter may be set to a multiple of L when the SCS of the cell in which the PDCCH is monitored is 480 kHz or 960 kHz. In some implementations, the PDCCH monitoring may be performed based on the 480 kHz SCS or 960 kHz SCS.

In some implementations, the UE may report as a UE capability a combination (X, Y) of i) a group of X slots and ii) Y slots within the X slots, where X and Y are the numbers of consecutive slots, and groups of X slots are consecutive without overlapping with each other. The PDCCH monitoring may be performed based on the configuration and the combination (X, Y). The BS may configure SS set(s) and/or perform PDCCH transmission, assuming that the UE will perform PDCCH monitoring based on the combination (X, Y) reported by the UE.

In some implementations, the UE may report as a UE capability a plurality of combinations (X, Y) related to i) a group of X slots and ii) Y slots within the X slots, where X and Y are the numbers of consecutive slots, and groups of X slots are consecutive without overlapping with each other. The UE may determine a combination (X, Y) for monitoring the PDCCH from among the reported plurality of combinations (X, Y) based on the configuration of the search space. The BS may configure SS set(s) and/or perform PDCCH transmission, assuming that the UE will perform the PDCCH monitoring based on the combinations (X, Y) reported by the UE.

In addition to the operation(s) described with reference to FIG. 5 or 6, one or more of the operations with reference to FIGS. 1 to 4 and/or the operations described in Section 1 may be further performed in combination.

Examples of Communication System to Which Implementations/Embodiments of the Present Disclosure is Applied The various descriptions, functions, procedures, proposals, methods, and/or operation flowcharts described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 7:
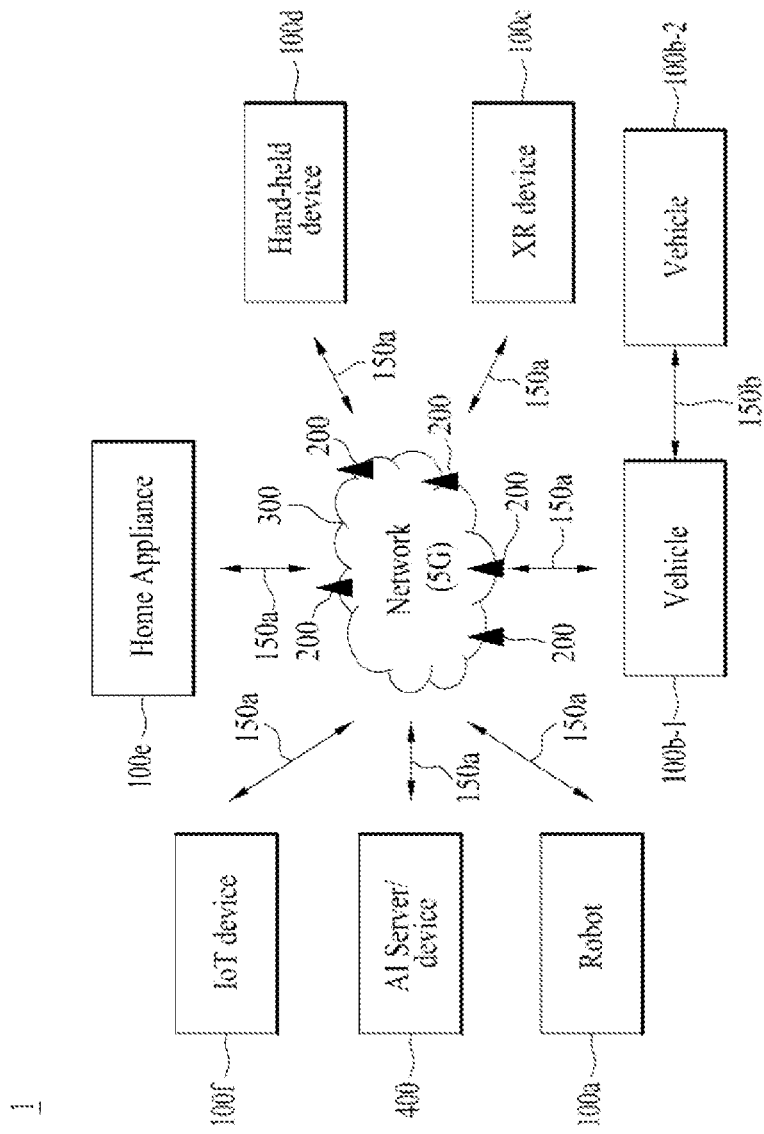
FIGS. 7 to 10 illustrate devices according to an embodiment of the present disclosure.

FIG. 7 illustrates a communication system 1 applied to the present disclosure.

Referring to FIG. 7, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200*a* may operate as a BS/network node for other wireless devices.

The wireless devices 100*a* to 100*f* may be connected to the network 300 via the BSs 200. An AI technology may be applied to the wireless devices 100*a* to 100*f*, and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without intervention of the BSs/network. For example, the vehicles 100*b*-1 and 100*b*-2 may perform direct communication (e.g., V2V/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, and 150*c* may be established between the wireless devices 100*a* to 100*f*/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g., relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to Which the Present Disclosure is Applied

Figure 8:
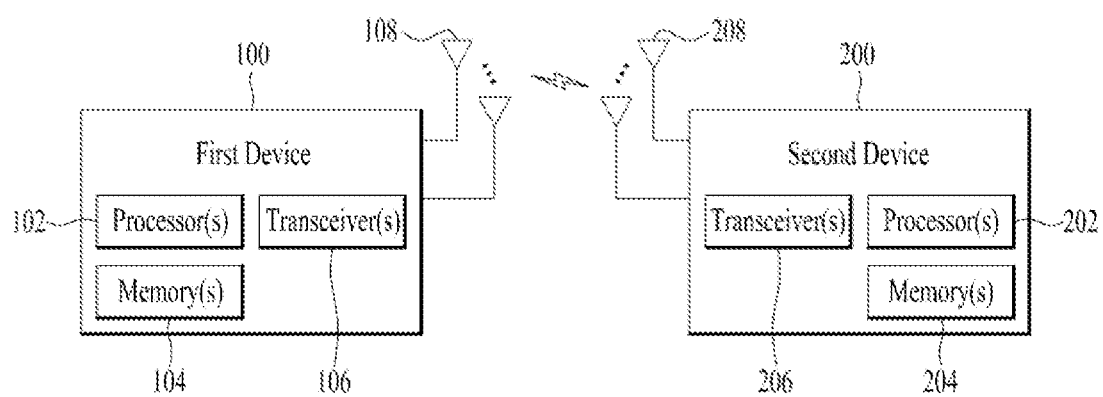

FIG. 8 illustrates wireless devices applicable to the present disclosure.

Referring to FIG. 8, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 6.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in the present disclosure. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in the present disclosure. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in the present disclosure. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in the present disclosure. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in the present disclosure. The one or more processors 102 and 202 may generate messages, control information, data, or information according to the descriptions, functions, procedures, proposals, methods, and/or operation flowcharts disclosed in the present disclosure and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in the present disclosure may be implemented using firmware or software, and the firmware or software may be configured to include the modules, procedures, or functions. Firmware or software configured to perform the descriptions, functions, procedures, proposals, methods, and/or operation flowcharts disclosed in the present disclosure may be included in the one or more processors 102 and 202 or may be stored in the one or more memories 104 and 204 and executed by the one or more processors 102 and 202. The descriptions, functions, procedures, proposals, methods, and/or operation flowcharts disclosed in the present disclosure may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of the present disclosure, to one or more other devices. The one or more transceivers 106 and 206 may receive user data, control information, and/or wireless signals/channels, mentioned in the descriptions, functions, procedures, proposals, methods, and/or operation flowcharts disclosed in the present disclosure, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Example of Use of Wireless Device to Which the Present Disclosure is Applied

Figure 9:
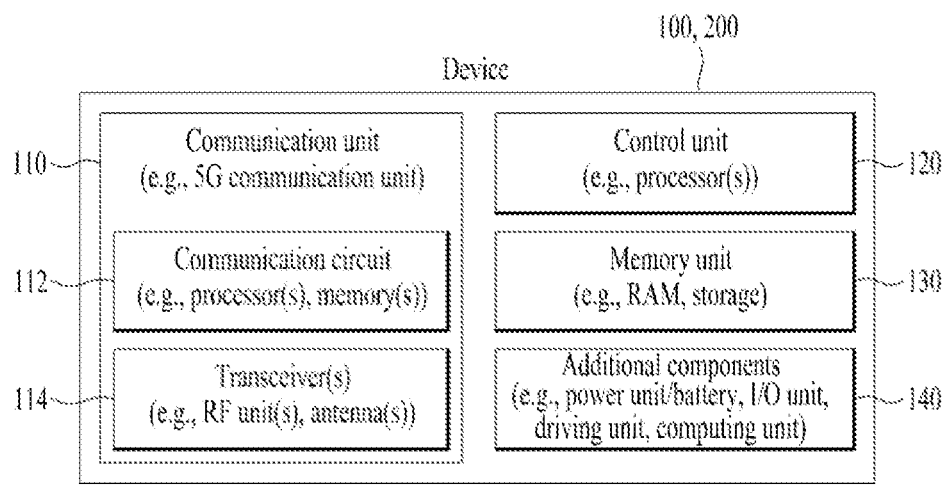

FIG. 9 illustrates another example of a wireless device applied to the present disclosure. The wireless device may be implemented in various forms according to a use case/service (refer to FIG. 7).

Referring to FIG. 9, wireless devices 100 and 200 may correspond to the wireless devices 100 and 200 of FIG. 8 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 8. For example, the transceiver(s) 114 may include the one or more transceivers 106 and 206 and/or the one or more antennas 108 and 208 of FIG. 8. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100*a* of FIG. 7), the vehicles (100*b*-1 and 100*b*-2 of FIG. 7), the XR device (100*c* of FIG. 7), the hand-held device (100*d* of FIG. 7), the home appliance (100*e* of FIG. 7), the IoT device (100*f* of FIG. 7), a digital broadcasting terminal, a hologram device, a public safety device, an MTC device, a medical device, a FinTech device (or a finance device), a security device, a climate/environment device, the AI server/device (400 of FIG. 7), the BSs (200 of FIG. 7), a network node, or the like. The wireless device may be mobile or fixed according to a use case/service.

Figure 10:
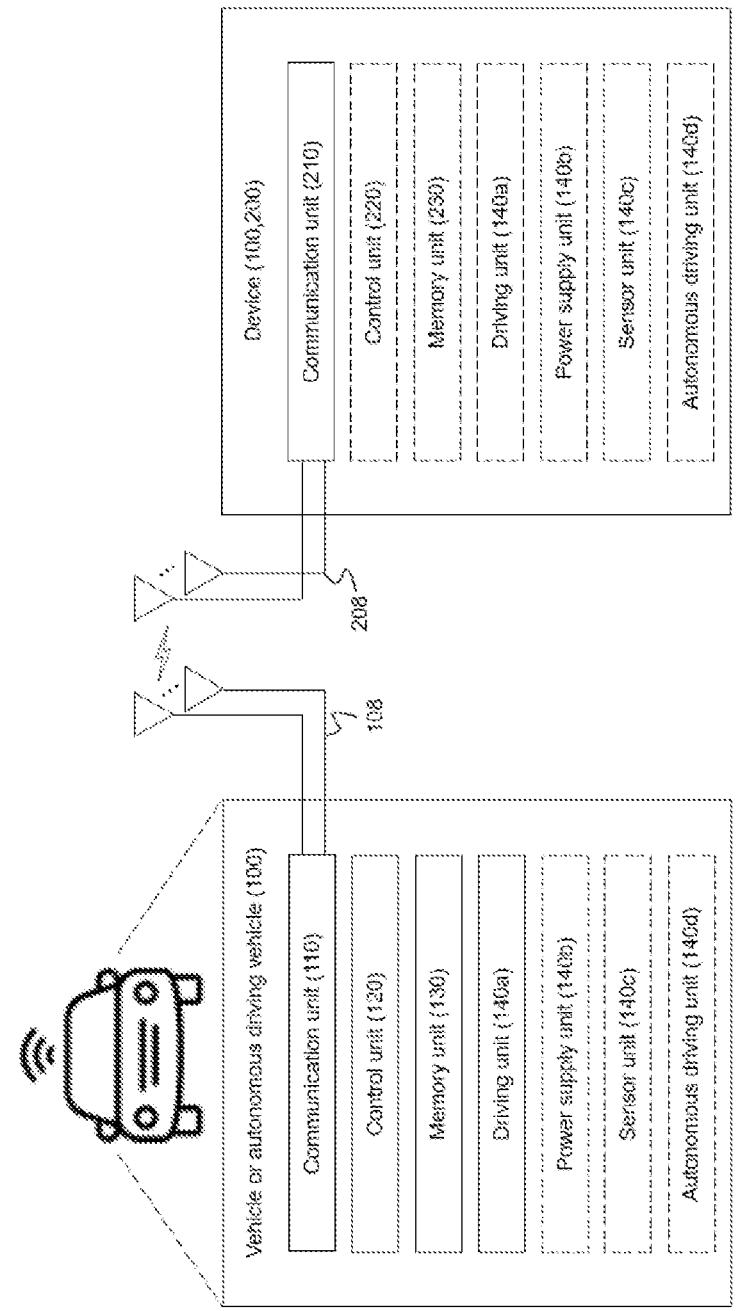

In FIG. 9, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof Example of Vehicle or Autonomous Driving Vehicle to Which the Present Disclosure is Applied FIG. 10 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 10, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 8, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

As described above, the present disclosure is applicable to various wireless communication systems.

What is claimed is:

1. A method for monitoring a control channel by a user equipment (UE) in a wireless communication system, the method comprising:
   receiving a configuration related to a search space set for a downlink (DL) bandwidth part (BWP) of a cell; and
   performing physical downlink control channel (PDCCH) monitoring in the DL BWP based on the configuration,
   wherein the configuration comprises:
   (i) a first parameter related to a periodicity and an offset of the PDCCH monitoring for the search space set;
   (ii) a second parameter related to D as a number of consecutive slots where the search space set can exist; and
   (iii) a third parameter related to L as a size of a slot-group configured for the search space,
   wherein the PDCCH monitoring is performed for the search space set within D slots,
   wherein the D slots are started from a slot determined based on the first parameter and a number of the D slots is determined based on the second parameter, and
   wherein a maximum valid value of the second parameter is a value obtained by subtracting the L from the periodicity.

2. The method of claim 1, wherein the PDCCH monitoring is performed based on 480 kHz subcarrier spacing (SCS) or 960 kHz SCS.

3. The method of claim 1, wherein the third parameter includes a bitmap indicating the at least one slot in the slot-group configured for the PDCCH monitoring.

4. The method of claim 3, wherein the L is equal to a length of the bitmap.

5. The method of claim 1, further comprising:
   reporting as a UE capability a combination (X, Y) related to i) groups of X slots and ii) Y slots within the X slots, wherein X and Y are numbers of consecutive slots and the groups of X slots are non-overlapping and consecutive,
   wherein the PDCCH monitoring is performed based on the configuration and the combination (X, Y).

6. The method of claim 1, further comprising:
reporting as a UE capability a plurality of combinations (X, Y) related to i) groups of X slots and ii) Y slots within the X slots, wherein X and Y are numbers of consecutive slots; and the groups of X slots are non-overlapping and consecutive; and
determining a combination (X, Y) for the PDCCH monitoring among the reported plurality of combinations (X, Y) based on the configuration,
wherein, based on one or more combinations (X, Y) of the reported plurality of combinations (X, Y) being related to the configuration, the PDCCH monitoring is performed according to a combination (X, Y) with a greatest value of X among the one or more combinations (X, Y).

7. The method of claim 1, wherein the second parameter is set to a multiple of the L.

8. The method of claim 1, wherein, based on the third parameter, the PDCCH monitoring is performed for the search space set within the D slots.

9. A user equipment (UE) for monitoring a control signal in a wireless communication system, the terminal comprising:
at least one transceiver;
at least one processor; and
at least one memory operatively connected to the at least one processor and configured to store instructions that, when executed, cause the at least one processor to perform operations, the operations comprising:
receiving a configuration related to a search space set for a downlink (DL) bandwidth part (BWP) of a cell; and
performing physical downlink control channel (PDCCH) monitoring in the DL BWP based on the configuration,
wherein the configuration comprises:
(i) a first parameter related to a periodicity and an offset of the PDCCH monitoring for the search space set;
(ii) a second parameter related to D as a number of consecutive slots where the search space set can exist; and
(iii) a third parameter related to L as a size of a slot-group configured for the search space set,
wherein the PDCCH monitoring is performed for the search space set within D slots,
wherein the D slots are started from a slot determined based on the first parameter and a number of the D slots is determined based on the second parameter, and
wherein a maximum valid value of the second parameter is a value obtained by subtracting the L from the periodicity.

10. A base station for transmitting a control channel in a wireless communication system, the base station comprising:
at least one transceiver;
at least one processor; and
at least one memory operatively connected to the at least one processor and configured to store instructions that, when executed, cause the at least one processor to perform operations, the operations comprising:
transmitting a configuration related to a search space set for a downlink (DL) bandwidth part (BWP) of a cell; and
transmitting a physical downlink control channel (PDCCH) in the DL BWP based on the configuration,
wherein the configuration comprises:
(i) a first parameter related to a periodicity and an offset of monitoring of the PDCCH for the search space set;
(ii) a second parameter related to D as a number of consecutive slots where the search space set can exist; and
(iii) a third parameter related to L as a size of a slot-group configured for the search space set,
wherein the PDCCH monitoring is performed for the search space set within D slots,
wherein the D slots are started from a slot determined based on the first parameter and a number of the D slots is determined based on the second parameter, and
wherein a maximum valid value of the second parameter is a value obtained by subtracting the L from the periodicity.

11. The base station of claim 10, wherein the PDCCH monitoring is performed based on 480 kHz subcarrier spacing (SCS) or 960 kHz SCS.

12. The base station of claim 10, wherein the third parameter includes a bitmap indicating the at least one slot in the slot-group configured for the PDCCH monitoring.

13. The base station of claim 12, wherein the L is equal to a length of the bitmap.

14. The base station of claim 10, wherein the second parameter is set to a multiple of the L.

15. The base station of claim 10, wherein, based on the third parameter, the PDCCH monitoring is performed for the search space set within the D slots.

* * * * *

UNITED STATES PATENT AND TRADEMARK OFFICE
CERTIFICATE OF CORRECTION

PATENT NO.         : 11,856,589 B2                                                    Page 1 of 1
APPLICATION NO.    : 18/162918
DATED              : December 26, 2023
INVENTOR(S)        : Seunghwan Choi et al.

It is certified that error appears in the above-identified patent and that said Letters Patent is hereby corrected as shown below:

In the Claims

Column 34: Claim 10, Line 4, delete "for transmitting a control channel"; Claim 10, Lines 13-14, delete "related to a search space set for a downlink (DL) bandwidth part (BWP) of a cell" and in its place insert --for a search space set--; Claim 10, Line 17, delete "DL BWP" and in its place insert --search space set--; Claim 10, Line 20, delete "of the PDCCH for the search space set"; Claim 10, Line 22, delete "consecutive"; Claim 10, Lines 24-25, delete "slot-group configured for the search space set" and in its place insert --group of slots for the monitoring--; Claim 10, Line 26, delete "monitoring is performed" and in its place insert --candidate is monitored--; Claim 10, Line 27, delete "D slots" and in its place insert --each of consecutive groups of slots--; Claim 10, Line 28, delete "D slots" and in its place insert --consecutive groups of slots--; Claim 10, Lines 29-30, delete "a number of the D slots is determined" and in its place insert --the number of the slots in the consecutive groups of slots is determined to D slots--; Claim 12, Line 39, delete "slot-group configured for the PDCCH" and in its place insert --group of slots configured for the--.

Signed and Sealed this
Twenty-ninth Day of July, 2025

Coke Morgan Stewart
*Acting Director of the United States Patent and Trademark Office*